US010635658B2

(12) United States Patent
Yam et al.

(10) Patent No.: US 10,635,658 B2
(45) Date of Patent: Apr. 28, 2020

(54) ASYNCHRONOUS SHARED APPLICATION UPGRADE

(71) Applicant: Oracle International Corporation, Redwood Shores, CA (US)

(72) Inventors: Philip Yam, San Carlos, CA (US); Thomas Baby, Maple Valley, WA (US); Andre Kruglikov, Atherton, CA (US); Kumar Rajamani, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 97 days.

(21) Appl. No.: 15/266,917

(22) Filed: Sep. 15, 2016

(65) Prior Publication Data

US 2018/0075086 A1 Mar. 15, 2018
US 2019/0278856 A9 Sep. 12, 2019

Related U.S. Application Data

(60) Provisional application No. 62/245,937, filed on Oct. 23, 2015.

(51) Int. Cl.

*G06F 16/23* (2019.01)
*G06F 8/65* (2018.01)
*G06F 11/14* (2006.01)

(52) U.S. Cl.

CPC ............ *G06F 16/2379* (2019.01); *G06F 8/65* (2013.01); *G06F 11/1474* (2013.01); *G06F 2201/87* (2013.01)

(58) Field of Classification Search

CPC ................................................ G06F 17/30377

(Continued)

(56) References Cited

U.S. PATENT DOCUMENTS 6,185,699 B1 2/2001 Haderle
6,205,449 B1 3/2001 Rastogi (Continued)

FOREIGN PATENT DOCUMENTS

WO WO 2006/045844 A1 5/2006
WO WO 2014/052851 4/2014

(Continued)

OTHER PUBLICATIONS

U.S. Appl. No. 13/631,815, filed Sep. 28, 2012, Office Action, dated Nov. 6, 2014.

(Continued)

*Primary Examiner* — Hicham Skhoun
(74) *Attorney, Agent, or Firm* — Hickman Palermo Becker Bingham LLP

(57) ABSTRACT

Techniques are provided for diverting, to cloned metadata, live access to original metadata of an application container that is being concurrently upgraded. In an embodiment, a database server stores, within an application container of an application, original metadata that defines objects for use by pluggable databases of the application. The database server receives a maintenance request to adjust the original metadata. The database server creates, in response to receiving the maintenance request, a reference container that contains cloned metadata that is a copy of the original metadata. The database server receives, during or after creating the reference container, a read request to read one of the objects. The database server concurrently performs both of: executing the maintenance request upon the original metadata, and executing the read request upon the cloned metadata of the reference container.

19 Claims, 6 Drawing Sheets

(58) Field of Classification Search
USPC .......................................................... 707/684
See application file for complete search history.

(56) References Cited

U.S. PATENT DOCUMENTS 6,226,650 B1 5/2001 Mahajan
6,295,610 B1 9/2001 Ganesh
6,804,671 B1 10/2004 Loaiza et al.
7,305,421 B2 12/2007 Cha
7,493,311 B1 2/2009 Cutsinger
7,822,717 B2 10/2010 Kappor et al.
8,117,174 B2 2/2012 Shaughnessy
8,335,767 B2 12/2012 Das et al.
8,364,648 B1 1/2013 Sim-Tang
8,478,718 B1 7/2013 Ranade
8,484,164 B1 * 7/2013 Sivakumar ............ G06F 3/0611 707/637
8,554,762 B1 10/2013 O'Neill
8,600,977 B2 12/2013 Dageville et al.
9,026,679 B1 5/2015 Shmuylovich
9,122,644 B2 9/2015 Kruglikov et al.
9,189,522 B2 11/2015 Das et al.
9,390,120 B1 7/2016 Gulliver
9,940,203 B1 4/2018 Ghatnekar
2002/0112022 A1 8/2002 Kazar et al.
2002/0143733 A1 10/2002 Mukkamalla
2003/0061537 A1 3/2003 Cha et al.
2004/0039962 A1 2/2004 Ganesh
2004/0054643 A1 3/2004 Vemuri
2004/0054644 A1 3/2004 Ganesh
2004/0177099 A1 9/2004 Ganesh
2004/0210577 A1 10/2004 Kundu
2004/0267809 A1 12/2004 East et al.
2005/0038831 A1 2/2005 Souder et al.
2005/0149552 A1 7/2005 Chan et al.
2005/0278276 A1 12/2005 Andreev et al.
2006/0047713 A1 3/2006 Gornshtein
2007/0100912 A1 5/2007 Pareek et al.
2007/0118527 A1 5/2007 Winje
2007/0244918 A1 10/2007 Lee et al.
2008/0016123 A1 1/2008 Devraj et al.
2008/0319958 A1 12/2008 Bhattacharya
2009/0282203 A1 11/2009 Haustein
2010/0185645 A1 7/2010 Pazdziora
2010/0318570 A1 12/2010 Narasinghanallur et al.
2011/0004586 A1 1/2011 Cherryholmes et al.
2011/0060724 A1 3/2011 Chan
2011/0087633 A1 4/2011 Kreuder et al.
2011/0126197 A1 5/2011 Larsen et al.
2011/0307450 A1 12/2011 Hahn et al.
2012/0109926 A1 5/2012 Novik et al.
2012/0173717 A1 7/2012 Kohli
2012/0284228 A1 11/2012 Ghosh
2012/0284544 A1 11/2012 Xian
2012/0287282 A1 11/2012 Lu
2012/0323849 A1 12/2012 Garin
2013/0080559 A1 3/2013 Rao
2013/0085742 A1 4/2013 Baker et al.
2013/0117237 A1 5/2013 Thomsen et al.
2013/0198133 A1 8/2013 Lee
2013/0212068 A1 8/2013 Talius et al.
2014/0032525 A1 1/2014 Merriman et al.
2014/0095452 A1 * 4/2014 Lee ..................... G06F 11/1471 707/683
2014/0095530 A1 4/2014 Lee et al.
2014/0095546 A1 4/2014 Kruglikov et al.
2014/0164331 A1 6/2014 Li et al.
2014/0188804 A1 7/2014 Gokhale
2014/0258241 A1 9/2014 Chen
2014/0337336 A1 11/2014 Carlson
2015/0120659 A1 4/2015 Srivastava
2015/0120780 A1 4/2015 Jain
2015/0254240 A1 9/2015 Li et al.
2015/0309831 A1 10/2015 Powers
2016/0352836 A1 12/2016 Kamalakantha
2017/0048314 A1 2/2017 Aerdts
2017/0116207 A1 4/2017 Lee
2017/0116213 A1 4/2017 Jain
2017/0116249 A1 4/2017 Ravipati
2017/0116278 A1 4/2017 Baby et al.
2017/0116298 A1 4/2017 Ravipati
2017/0116321 A1 4/2017 Jain et al.
2017/0116334 A1 4/2017 Kruglikov et al.
2017/0357550 A1 12/2017 Jain
2018/0075044 A1 3/2018 Kruglikov
2019/0102384 A1 4/2019 Hung et al.
2019/0102411 A1 4/2019 Hung et al.

FOREIGN PATENT DOCUMENTS

WO WO 2014/052851 A1 4/2014
WO WO2014/052851 A1 4/2014
WO WO 2014/145230 A1 9/2014

OTHER PUBLICATIONS

U.S. Appl. No. 13/631,815, filed Sep. 28, 2012, Notice of Allowance, dated Aug. 20, 2015.
U.S. Appl. No. 13/631,815, filed Sep. 8, 2012, Notice of Allowance, dated Apr. 3, 2015.
U.S. Appl. No. 13/631,815, filed Sep. 28, 2012, Office Action, dated Dec. 23, 2013.
U.S. Appl. No. 13/631,815, filed Sep. 28, 2012, Office Action, dated May 29, 2014.
Rajeev Kumar et al., ORACLE DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle, "Database Concepts", 15 Backup and Recovery, dated 2016, 24 pages.
Oracle Base, Multitenant: Create and Configure a Pluggable Database (PDB) in Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud," 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
U.S. Appl. No. 14/202,091, filed Mar. 10, 2014, Notice of Allowance, dated Feb. 26, 2016.
U.S. Appl. No. 13/830,349, filed Mar. 14, 2013, Office Action, dated Nov. 5, 2014.
U.S. Appl. No. 13/830,349, filed Mar. 14, 2013, Notice of Allowance, dated Oct. 19, 2015.
U.S. Appl. No. 13/830,349, filed Mar. 14, 2013, Interview Summary, dated Mar. 9, 2015.
U.S. Appl. No. 13/830,349, filed Mar. 14, 2013, Final Office Action, dated Jun. 2, 2015.
Ravipati, U.S. Appl. No. 15/215,443, filed Jul. 20, 2016, Office Action, dated Sep. 19, 2018.
Ravipati, U.S. Appl. No. 15/215,435, filed Jul. 20, 2016, Office Action, dated Sep. 19, 2018.
Lee, U.S. Appl. No. 15/215,446, filed Jul. 20, 2016, Restrcition Requirement, dated Oct. 1, 2018.

(56) References Cited

OTHER PUBLICATIONS

Kruglikov, U.S. Appl. No. 15/266,902, filed Sep. 15, 2016, Office Action, dated Aug. 6, 2018.
Zisman et al., "An approach to interoperation between autonomous database systems", Distrib. Syst. Engng 6 (1999) 135-148. Printed in the UK, 15 pages.
Weishar et al., "An Intelligent Heterogeneous Autonomous Database Architecture for Semantic Heterogeneity Support", IEEE Workshop on Interoperability in Multidatabase Systems, dated Apr. 1991, 9 pgs.
Rodd et al., "Adaptive Tuning Algorithm for Performance tuning of Database Management System", (IJCSIS) International Journal of Computer Science Information Security,vol. 8, No. 1, Apr. 2010, 4pgs.
Pavlo, "Self-Driving Database Management Systems", 8th Biennial Conference on Innovative Data Systems Research (CIDR '17), Jan. 8-11, 2017 , Chaminade, California, USA, 6 pages.
Maenhaut et al., "Design and Evaluation of a Hierarchical Multi-Tenant Data Management Framework for Cloud Applications", dated 2015, 6 pages.
Gey et al., "Evolving Multi-tenant SaaS Applications through Self-Adaptive Upgrade Enactment and Tenant Mediation", SEAMS'16 May 16-17, 2016, Austin, TX, USA 2016 AC,7 pages.
Das et al., "Scalable and Elastic Transactional Data Stores for Cloud Computing Platforms", dated Dec. 2011, 302 pages.
Das et al., "Automated Demand-Driven Resource Scaling in Relational Database-as-aService", SIGMOD'16, Jun. 26-Jul. 1, 2016, San Francisco, CA, USA, 12 pages.
Beschastnikh et al., "Machine Learning for Automatic Physical DBMS Tuning", dated Dec. 6, 2007, 6 pages.
Agrawal et al., "Database Scalability, Elasticity, and Autonomy in the Cloud", dated 2011, 14 pages.
Lee, U.S. Appl. No. 15/215,446, filed Jul. 20, 2016, Office Action, dated Nov. 16, 2018.
Kruglikov, U.S. Appl. No. 15/266,902, filed Sep. 15, 2016, Interview Summary, dated Oct. 1, 2018.
Baby, U.S. Appl. No. 15/331,657, filed Oct. 21, 2016, Office Action, dated Aug. 28, 2018.
Ravipati, U.S. Appl. No. 15/215,443, filed Jul. 20, 2016, Interview Summary, dated Jan. 4, 2019.
Ravipati, U.S. Appl. No. 15/215,435, filed Jul. 20, 2016, Interview Summary, dated Jan. 4, 2019.
Krugikov, U.S. Appl. No. 15/266,902, filed Sep. 15, 2016, Interview Summary, dated Feb. 20, 2019.
Krugikov, U.S. Appl. No. 15/266,902, filed Sep. 15, 2016, Final Office Action, dated Jan. 31, 2019.
Oracle White Paper Database Live Migration with Oracle Multitenant and the Oracle Universal Connection Pool on Oracle Real Application Clusters (RAC), dated Oct. 15, 2014, 13 pages.
Ravipati, U.S. Appl. No. 15/215,443, filed Jul. 20, 2016, Final Office Action, dated Mar. 11, 2019.
Ravipati, U.S. Appl. No. 15/215,435, filed Jul. 20, 2016, Final Office Action, dated Mar. 14, 2019.
Lee, U.S. Appl. No. 15/215,446, filed Jul. 20, 2016, Interview Summary, dated May 3, 2019.
Lee, U.S. Appl. No. 15/215,446, filed Jul. 20, 2016, Final Office Action, dated Mar. 12, 2019.
Jain, U.S. Appl. No. 15/093,506, filed Apr. 7, 2016, Office Action, dated Mar. 20, 2019.
Baby, U.S. Appl. No. 15/331,657, filed Oct. 21, 2016, Notice of Allowance, dated Mar. 4, 2019.
Urbano Randy et al., "Oracle Database Administrator's Guide", 12c Release dated Jul. 31, 2017, pp. 1-1500.
Ravipati, U.S. Appl. No. 15/215,443, filed Jul. 20, 2016, Office Action, dated Jul. 18, 2019.
Kruglikov, U.S. Appl. No. 15/331,525, filed Oct. 21, 2016, Office Action, dated Jul. 25, 2019.
Jain, U.S. Appl. No. 15/331,534, filed Oct. 21, 2016, Office Action, dated Jun. 28, 2019.
Jain, U.S. Appl. No. 15/093,506, filed Apr. 7, 2016, Interview Summary, dated Jul. 8, 2019.
Baby, U.S. Appl. No. 15/331,540, filed Oct. 21, 2016, Office Action, dated Jul. 9, 2019.
Ravipati, U.S. Appl. No. 15/215,443, filed Jul. 20, 2016, Advisory Action, dated Jun. 5, 2019.
Ravipati, U.S. Appl. No. 15/215,435, filed Jul. 20, 2019, Advisory Action, dated Jun. 5, 2019.
Lee, U.S. Appl. No. 15/215,446, filed Jul. 20, 2016, Advisory Action, dated Jun. 4, 2019.
Kruglikov, U.S. Appl. No. 15/331,525, filed Oct. 21, 2016, Notice of Allowance, dated Oct. 17, 2019.
Kruglikov, U.S. Appl. No. 15/331,525, filed Oct. 21, 2016, Interview Summary, dated Aug. 28, 2019.
Ravipati, U.S. Appl. No. 15/215,443, filed Jul. 20, 2016, Final Office Action, dated Dec. 4, 2019.
Lee, U.S. Appl. No. 15/215,446, filed Jul. 20, 2019, Final Office Action, dated Dec. 4, 2019.
Krugikov, U.S. Appl. No. 15/266,902, filed Sep. 15, 2016, Notice of Allowance, dated Nov. 2, 2019.
Jain, U.S. Appl. No. 15/093,506, filed Apr. 7, 2016, Final Office Action, dated Oct. 28, 2019.
Baby, U.S. Appl. No. 15/331,540, filed Oct. 21, 2016, Notice of Allowance, dated Nov. 14, 2019.
Ravipati, U.S. Appl. No. 15/215,435, filed Jul. 20, 2016, Advisory Action, dated Jan. 24, 2020.
Ravipati, U.S. Appl. No. 15/215,435, filed Jul. 20, 2016, Interview Summary, dated Jan. 15, 2020.
Jain, U.S. Appl. No. 15/331,534, filed Oct. 21, 2016, Final Office Action, dated Jan. 8, 2020.
Jain, U.S. Appl. No. 15/093,506, filed Apr. 7, 2016, Notice of Allowance, dated Jan. 6, 2020.

* cited by examiner

201
Store original metadata within application container
202
Receive maintenance request to adjust original metadata
203
In response to receiving maintenance request, create reference container
204
Receive read request
POTENTIALLY CONCURRENT
205
Execute maintenance request upon original metadata
206
Execute read request upon cloned metadata of reference container

CONTAINER DATABASE 300

SERVER
630
INTERNET
628
ISP
626
LOCAL
NETWORK
622
HOST
624
NETWORK
LINK
620
600
STORAGE
DEVICE
66
ROM
608
MAIN
MEMORY
606
BUS
602
COMMUNICATION
INTERFACE
618
PROCESSOR
604
DISPLAY
612
INPUT DEVICE
614
CURSOR
CONTROL
616

ASYNCHRONOUS SHARED APPLICATION UPGRADE

CROSS-REFERENCE TO RELATED APPLICATIONS

This application is related to the following applications, each of which is incorporated by reference as if fully set forth herein:

application Ser. No. 13/631,815, filed Sep. 28, 2012, titled "Container Database";

U.S. Pat. No. 9,298,564, filed Mar. 14, 2013, titled "In Place Point-In-Time Recovery Of Pluggable Databases";

application Ser. No. 14/202,091, filed Mar. 10, 2014, titled "Instantaneous Unplug Of Pluggable Database From One Container Database And Plug Into Another Container Database";

application Ser. No. 15/093,506, filed Apr. 7, 2016, titled "Migrating A Pluggable Database Between Database Server Instances With Minimal Impact To Performance";

application Ser. No. 15/215,443, filed Jul. 20, 2016, titled "Techniques For Keeping A Copy Of A Pluggable Database Up To Date With A Source Pluggable Database In Read-Write Mode"; and application Ser. No. 15/215,446, filed Jul. 20, 2016, titled "Near-zero Downtime Relocation of a Pluggable Database across Container Databases".

application Ser. No. 15/331,525, filed Oct. 21, 2016, titled "Application Containers for Container Databases".

FIELD OF THE DISCLOSURE

This disclosure relates to hot upgrade for multitenant database systems. Techniques are presented for diverting, to cloned metadata, live access to original metadata of an application container database that is being concurrently upgraded.

BACKGROUND

Database consolidation involves distributing and sharing computing resources among multiple databases managed by one or more database servers of database management systems (DBMS). Databases may be consolidated using a container DBMS. A consolidated database, such as a multitenant container database (CDB), includes one or more pluggable databases (PDBs). In a container DBMS, each pluggable database may be opened or closed in the container database independently from other pluggable databases.

Furthermore, a DBMS may have multiple server instances for a same container database. For example, sharding, replication, and horizontal scaling are topologies that may utilize multiple server instances for a database.

Typically each server instance occupies a separate host computer. Server instances may exchange data content and control information over a computer network. For example, server instances may collaborate to answer a federated query, to synchronize replication, and to rebalance data storage demand.

Each database server instance may be a container database that contains one or more pluggable databases. However, server instances need not have identical sets of pluggable databases. For example, one server instance may have a particular pluggable database that another server instance lacks.

Pluggable databases may be "plugged in" to a container database, and may be transported between database servers and/or DBMSs. The container DBMS may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases.

A database application may be composed of an application root and multiple pluggable databases. The application root and application pluggable databases belong to a container database. Without introducing a separate database server, an application's pluggable databases may be more or less isolated from other applications of the same container database by placing all of the application's pluggable databases within a dedicated application container. The related application titled "Application Containers for Container Databases" further explains the nature of a container database, an application container, and an application pluggable database, as well as their relationship to each other. For example, an application container is responsible for storing application metadata. For such storage, the application container may have an application root, which is another database that belongs to the container database.

An application may access a pluggable database by establishing a database session on the container DBMS for that pluggable database, where a database session represents the connection between an application and the container DBMS for accessing the pluggable database. A database session is initiated for a pluggable database by, for example, transmitting a request for a new connection to the container DBMS, the request specifying the pluggable database. A container DBMS may host multiple database sessions, each database session being for one of multiple pluggable databases.

The architecture of a container database greatly facilitates transporting the pluggable databases of an application between database servers and/or DBMSs. Tablespace files and a data dictionary store may be moved between environments of container DBMSs using readily available mechanisms for copying and moving files.

An application container provides advantages for database consolidation. Some advantages are provided as a consequence of using pluggable databases, such as a high degree of isolation concurrently along with a high degree of resource sharing. Multiple pluggable databases may run on the same database server and/or database server instance, allowing the computing resources of a single database server or instance to be shared between multiple pluggable databases. Other advantages are arise from the application container itself, such as providing resources of an application for sharing by pluggable databases of the application.

The isolation provided by an application container is at an existential level. The users of a database session established for a pluggable database may only access or otherwise view database objects defined via the database dictionary of the pluggable database or the database dictionary of its application container. Database objects of other application containers cannot be accessed or viewed. This degree of isolation is extended to administrators.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Database Server
2.1 Database Application and Application Container
2.2 Application Container Upgrade
2.3 Application Container Clone
2.4 Metadata Diversion
3.0 Metadata Diversion Process
3.1 Application Container Upgrade
3.2 Metadata Location Mapping
3.3 Metadata Switching
4.0 Metadata Binding
5.0 Clone Consistency
5.1 Undo Record and Transaction Rollback
5.2 Rollback Mechanics
6.0 Independent Synchronization
6.1 SQL Recording
6.2 Limited Asynchrony
6.3 SQL Replay
7.0 Hardware Overview

1.0 General Overview

Techniques are provided for diverting, to cloned metadata, live access to original metadata of an application container that is being concurrently upgraded. In an embodiment, a database server stores, within an application container of an application, original metadata that defines objects for use by pluggable databases of the application. The database server receives an upgrade or other maintenance request to adjust the original metadata. The database server creates, in response to receiving the maintenance request, a reference container that contains cloned metadata that is a copy of the original metadata. The database server receives, during or after creating the reference container, a read request to read one of the objects. The database server concurrently performs both of: executing the maintenance request upon the original metadata, and executing the read request upon the cloned metadata of the reference container.

In an embodiment an identifier, such as an application version identifier or an application container identifier, determines which metadata is actually read. For example, an identifier may be configured to identify either the reference container or the application container. The current value of the identifier may be used to select which metadata is actually read during metadata retrieval.

2.0 Example Database Server

Figure 1:
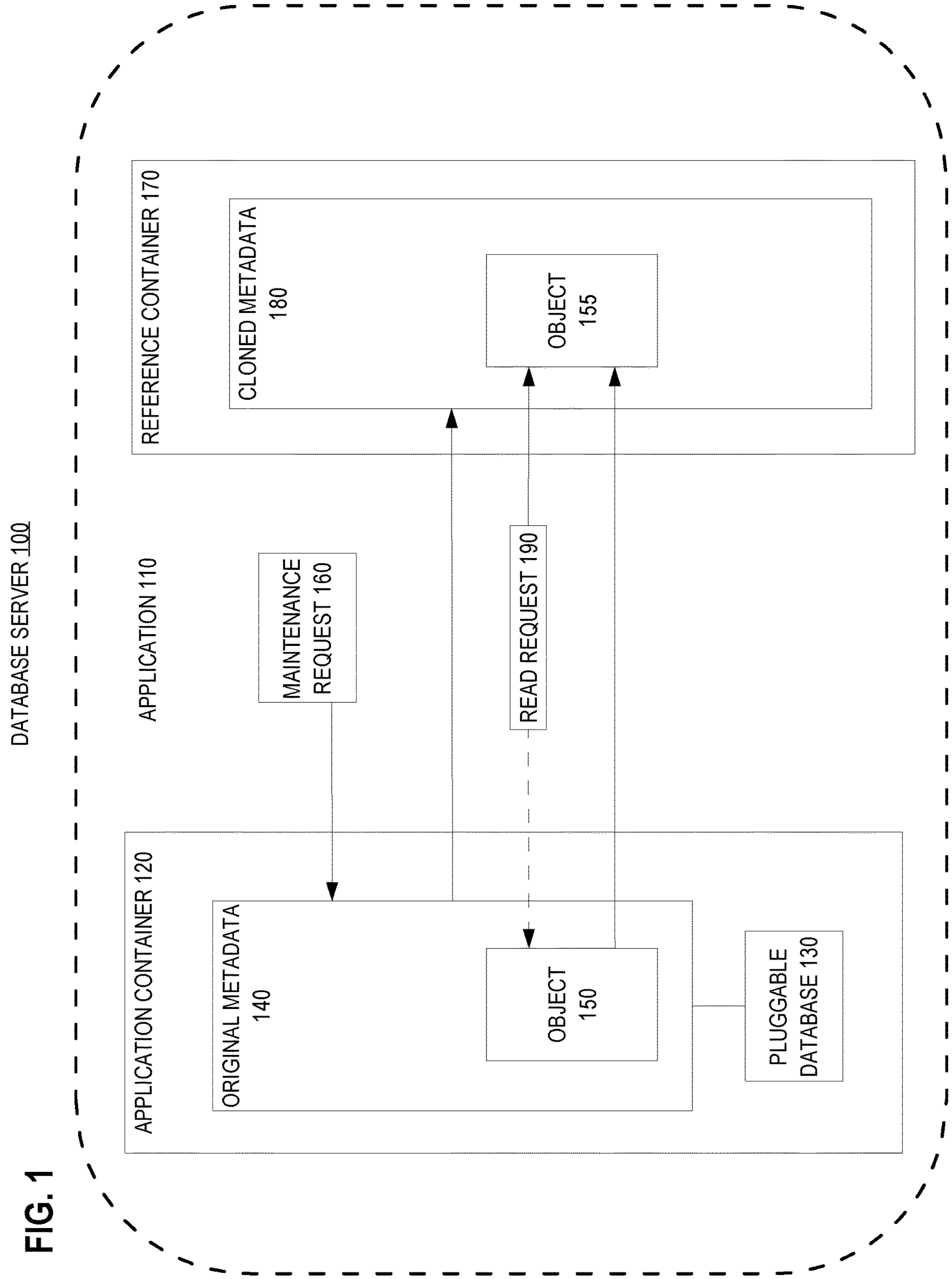
FIG. 1 is a block diagram that depicts an example database server that diverts, to cloned metadata, live access to original metadata of an application container that is being concurrently upgraded, in an embodiment.

FIG. 1 is a block diagram that depicts an example database server 100, in an embodiment. Database server 100 diverts, to cloned metadata, live access to original metadata of an application container that is being concurrently upgraded.

Database server 100 may be a server instance of a database management system (DBMS) or other relational database system. Database server 100 may be hosted by at least one computer such as a rack server such as a blade, a personal computer, a mainframe, a network appliance, a virtual machine, or other computing device. Database server 100 may access data that is stored in memory, on disks, or over a network.

2.1 Database Application and Application Container Database

Database server 100 may be a multitenant system that hosts databases that are associated with various applications. Database server 100 may organize its databases according to a hierarchy.

A pluggable database, such as 130, is the finest grained database. An application, such as 110, may include one or multiple pluggable databases. For example, application 110 may be an inventory application that has one pluggable database to manage West Coast inventory and a similar pluggable database to manage East Coast inventory. As such, both pluggable databases may share some metadata, with the possibility of centralized maintenance. In another example, application 110 may be a retailing application that has one pluggable database for inventory management and another pluggable database for account management, again with some shared metadata. Database server 100 may host multiple applications, such as 110.

Some or all pluggable databases of application 110 may be contained within an application container, such as 120. Metadata that is shared by pluggable databases of application 110 may be centralized within metadata, such as original metadata 140, within application container 120.

For example, some or all of the pluggable databases of application 110 may share a relational schema that occupies original metadata 140. In embodiments, original metadata 140 contains or is contained within a control file and/or a data dictionary.

In an embodiment, application container 120 contains a pluggable database, such as 130 or an additional one such as an application root database, which contains some or all of original metadata 140. In an alternative embodiment, application container 120 itself directly contains all of original metadata 140 without delegating such containment to any of the pluggable databases of application container 120.

2.2 Application Container Upgrade

Over time, a new software version of application 110 may be released. A new version may be a major release with changes that affect multiple parts of application 110 or a minor patch that is limited in scope and impact. During operation by this example, database server 100 receives a command to upgrade application 110 with a major release.

A minor patch may be applied to application 110 without taking application 110 out of service. Whereas, applying a major release would traditionally disrupt service of application 110.

However, database server 100 is configured to apply a major release without disrupting service. Database server 100 achieves this by creating cloned metadata 180 that may temporarily act as metadata system of record for application container 120 while the upgrade adjusts original metadata 140.

In operation, database server 100 may receive maintenance request 160 to upgrade application 110. Maintenance request 160 may be a digital message such as an XML document, a remote request such as an HTTP Get, a subroutine invocation, a software command, or other software signal.

Maintenance request 160 may be generated by a script such as of SQL or shell, or manually entered such as at a command prompt. Maintenance request 160 may be delivered to database server 100 either synchronously such as with HTTP or asynchronously such as with Java message service (JMS).

Maintenance request 160 may bear an identifier of application container 120. Maintenance request 160 may specify a file path to a script such as of SQL or shell and/or a file path to a software package or archive that contains a release of application 110.

2.3 Application Container Clone

Database server 100 may react to maintenance request 160 by creating reference container 170 within a same database server instance 100 as application container 120. Reference container 170 need not be a complete clone of application container 120.

For example, reference container 170 need not have a copy of pluggable database 130. In embodiments, reference container 170 may allow only read only use, comprise read only files, and/or refuse client connections.

However, cloned metadata 180 should more or less be a clone of original metadata 140. For example, within original metadata 140 are metadata objects, such as 150, that may be copied into cloned metadata 180, such as object 155.

2.4 Metadata Diversion

Because metadata objects 150 and 155 have the same data, client read-access demand (such as read request 190) upon object 150 may instead be satisfied by reading its clone, object 155. Furthermore, original metadata 140 and object 150 may be inconsistent or otherwise unavailable during execution of read request 190, such as during an upgrade of application 110.

Read request 190 may be a digital message such as an XML document, a remote request such as an HTTP Get, a subroutine invocation, a software command, or other software signal.

Read request 190 may be generated by a script such as of SQL or shell, or manually entered such as at a command prompt. Read request 190 may be delivered to database server 100 either synchronously such as with HTTP or asynchronously such as with Java message service (JMS).

Read request 190 may identify pluggable database 130 or application container 120. Read request 190 may expressly specify reading of metadata. Alternatively, read request 190 may specify reading of non-metadata data that impliedly requires reading metadata to support reading of other data.

Database server 100 detects that it receives read request 190 while original metadata 140 is being upgraded. Database server 100 reacts to detecting this condition by executing read request 190 against cloned metadata 180 instead of original metadata 140. The mechanics of diverting read request 190 from original metadata 140 to cloned metadata 180 are discussed later herein.

3.0 Metadata Diversion Process

Figure 2:
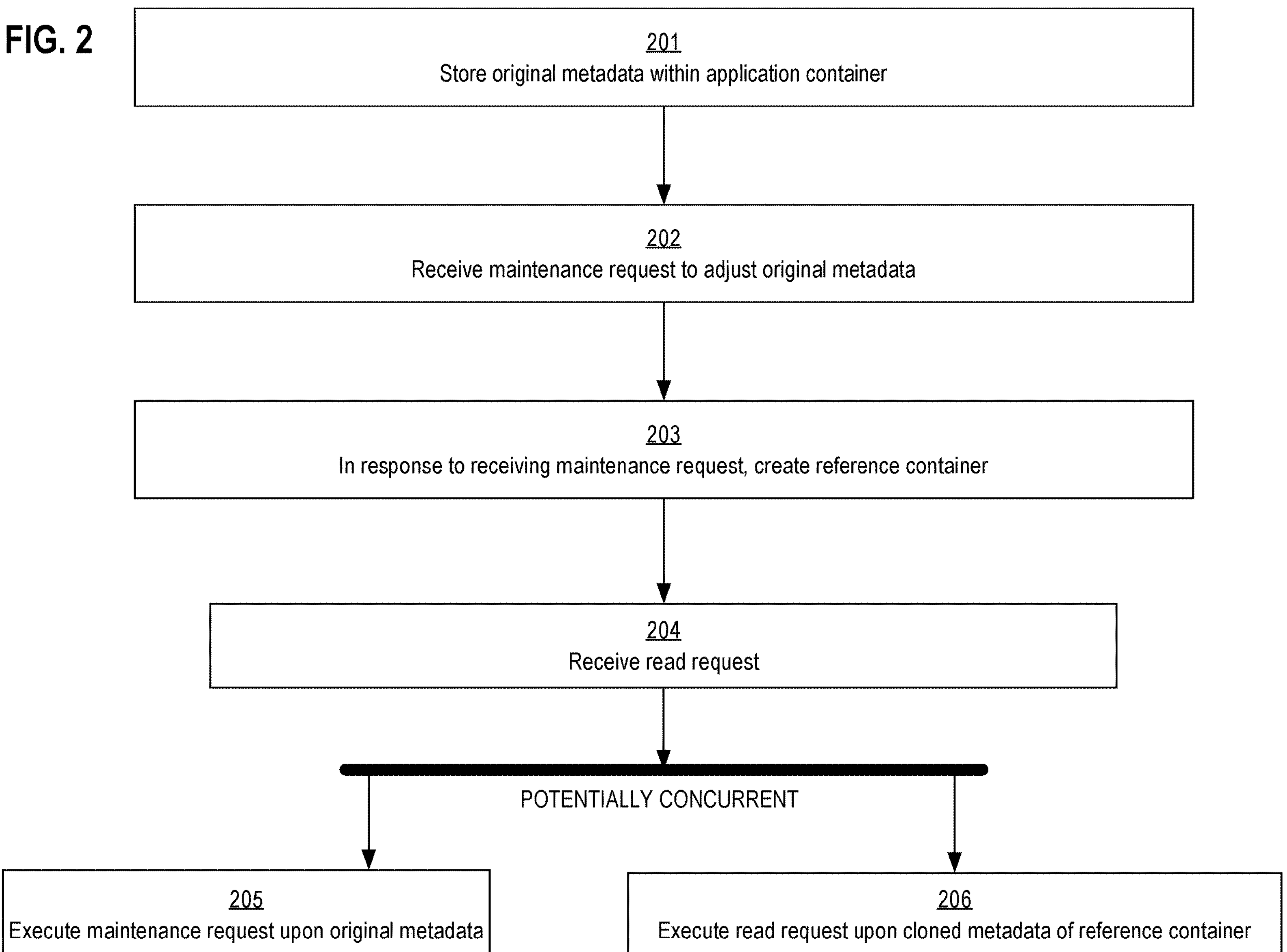
FIG. 2 is a flow diagram that depicts an example process that diverts, to cloned metadata, live access to original metadata of an application container that is being concurrently upgraded, in an embodiment.

FIG. 2 is a flow diagram that depicts an example process that diverts, to cloned metadata, live access to original metadata of an application container that is being concurrently upgraded. FIG. 2 is discussed with reference to FIG. 1.

Step 201 is preparatory. In step 201, original metadata is stored within an application container. For example, database server 100 stores original metadata 140 within files of application container 120.

Original metadata 140 may be created and stored when application container 120 is created. For example, installation of application 110 may cause creation of application container 120, pluggable databases such as 130, and original metadata 140.

Storage of original metadata 140 may occur into volatile or non-volatile memory or onto mechanical disk. Such storage may be remote or local to the computer(s) that host database server 100.

3.1 Application Container Upgrade

In step 202, a maintenance request to adjust the original metadata is received. For example, database server 100 may receive maintenance request 160 to upgrade application 110. In an embodiment, maintenance request 160 specifies that application container 120 should remain in service during execution of maintenance request 160.

In step 203 and in response to receiving the maintenance request, a reference container is created. For example, database server 100 creates reference container 170 while fulfilling maintenance request 160.

In an embodiment, maintenance request 160 expressly indicates that a reference container should be created. In an embodiment, database server implicitly creates reference container 170 to fulfil maintenance request 160.

In an embodiment, database server 100 creates reference container 170 by copying some or all files of application container 120. For example, some or all of original metadata 140 may occupy a control file that may be copied from application container 140 to reference container 170.

3.2 Metadata Location Mapping

In step 204, a read request is received during or after creation of the reference container and while maintenance request 205 is outstanding (received but unfulfilled). For example, database server 100 receives read request 190 that attempts to read original metadata 140.

Read request 190 may attempt to read particular objects, such as 150, that occupy original metadata 140. Read request 190 may originate from within application 110, such as during live and ordinary transaction processing against application container 120 or an included pluggable database, such as 130.

Embodiments of database server 100 may detect that application container 120 is being upgraded and that original metadata 140 may be unavailable because of the ongoing upgrade. In an embodiment, database server 100 sets an upgrade flag upon receipt of maintenance request 160 to indicate an ongoing upgrade. Database server 100 may check the upgrade flag to decide how to process read request 190.

In embodiments, database server 100 may establish more significant state changes in response to receiving maintenance request 160 to indicate an ongoing upgrade. For example, database server 100 may temporarily adjust original metadata 140 to indicate that some or all access to original metadata 140 should be diverted to cloned metadata 180.

In an embodiment, database server 100 maintains a lookup table or other association that maps metadata access to actual metadata, such as 140 or 180. In an embodiment, the mapping is from client connection to actual metadata.

In an embodiment, the mapping is from pluggable database to actual metadata. For example, one pluggable database of application container 120 may have its metadata access diverted to cloned metadata 180. Whereas, another pluggable database of the same application container 120 at the same time may directly access original metadata 140.

In an embodiment, diversion or selective (mapped) diversion may remain in effect after upgrading application container 120 and perhaps indefinitely. For example, cloned metadata 180 is not upgraded and may be retained for backward compatibility needed to support a legacy pluggable database whose codebase maintenance has ceased.

In an embodiment, an identifier determines which metadata is actually read. For example, an identifier may be configured to identify either the reference container or the application container. The current value of the identifier may be used to select which metadata is actually read during metadata retrieval.

In an embodiment, adjustment of original metadata 140 during an upgrade includes storing an identifier or locator of cloned metadata 180 into original metadata 140. In a preferred embodiment, an application root database of application container 120 contains original metadata 140, and adjustment of original metadata 140 includes replacement of a reference to the application root database with a reference to a clone of the application root database that occupies reference container 170.

In an embodiment, this may include storing an identifier of an object of cloned metadata 180, such as object 155, into original metadata 140.

For example, the declaration of object 150 may be decoupled from the implementation of object 150. For example and although not shown, original metadata 140 or another part of application container 120 may contain a metadata entry that declares object 150 and provides a pointer or reference to object 150 itself.

In an embodiment and as part of creating reference container 170, database server 100 temporarily adjusts the declaration of object 150, such that the reference within the declaration points to object 155 instead of object 150. In an embodiment, database server 100 may ordinarily inspect references and identifiers within original metadata 140 as part of detecting where metadata objects, such as 150, actually reside, such as within cloned metadata 180. The mechanics of metadata cross-referencing and retargeting of metadata are discussed later herein.

3.3 Metadata Switching

Steps 205-206 may potentially occur simultaneously. This may be partly because requests 160 and 190 may be fulfilled by separate threads of execution and partly because requests 160 and 190 operate upon different metadata collections 140 and 180.

In step 205, the maintenance request is executed upon the original metadata. For example, database server 100 executes maintenance request 160 to upgrade application container 120.

Execution of maintenance request 160 may be more or less long-running as compared to ordinary online transaction processing (OLTP) such as for read request 190. For example, maintenance request 160 may cause original metadata 140 to become inconsistent or otherwise unavailable during execution of maintenance request 160 and without causing any interruption of service at application container 120.

In step 206, the read request is executed upon the cloned metadata. For example, database server 100 executes read request 190 to retrieve desired information from cloned metadata 180, even though read request 190 would ordinarily retrieve the same information from original metadata 140 instead.

After completion of step 205, original metadata 140 has regained consistency and may again become the metadata system of record for application container 120. By this point metadata 140 and 180, which were more or less identical upon completion of step 203, may have divergent content.

For example, the upgrade of application 110 may cause addition of a new column to a metadata table of original metadata 140. However so long as read requests such as 190 continue to be diverted to cloned metadata 180, upgraded metadata (such as the new column) will not be available to application 110.

As such, completion of step 205 may finally include or be followed by restoration of identifiers and references that were retargeted to divert access to cloned metadata 180. For example, any reference to cloned metadata 180 or object 155 should be restored by database server 100 to once again respectively refer to original metadata 140 and object 150.

However and although such restoration of original targeting of metadata should not occur until step 205 is complete, such restoration need not wait for completion of step 206, which is the actual use of cloned metadata 180. For example, the reinstatement of original metadata 140 as a system of record may occur even though some reading of cloned metadata 180 is still ongoing.

In an embodiment, reinstatement of original metadata 140 as a system of record is full reinstatement for all uses and clients of application container 120. In another embodiment, reinstatement is limited to a subset of the pluggable databases of application container 120.

For example, one pluggable database may have its metadata retrieval resume access of original metadata 140. Whereas metadata access by another pluggable database may continue to be diverted to cloned metadata 180.

In a preferred embodiment, a so-called 'synchronization' (sync) command designates a subset of pluggable databases that should have restored access to original metadata 140, which was upgraded and is ready to be returned into service. In an embodiment, a sync command also causes additional upgrade activity to be applied to the subset of pluggable databases. The sync command is discussed later herein.

Furthermore and eventually, steps 205-206 finish, and cloned metadata 180 may become unnecessary. At that point, the upgrading of application 110 is complete, and reference container 170 may be deleted. However scenarios explained below may more or less prevent deletion of reference container 170, such as upgrading application container 120 without upgrading all of its pluggable databases. In that case, at least one of its pluggable databases may have a continued need for cloned metadata 180.

As such, deletion of reference container 170 may be inappropriate until some time after upgrading application container 120. In another example, reference container 170 is not deleted so that a subset of application pluggable databases can be restored, within application container 120, to an historic version from backup that expects old metadata.

In an embodiment, database server 100 automatically deletes reference container 170 when no longer needed. In an embodiment a command, such as an interactive command, causes database server 100 to delete reference container 170.

4.0 Metadata Binding

Figure 3:
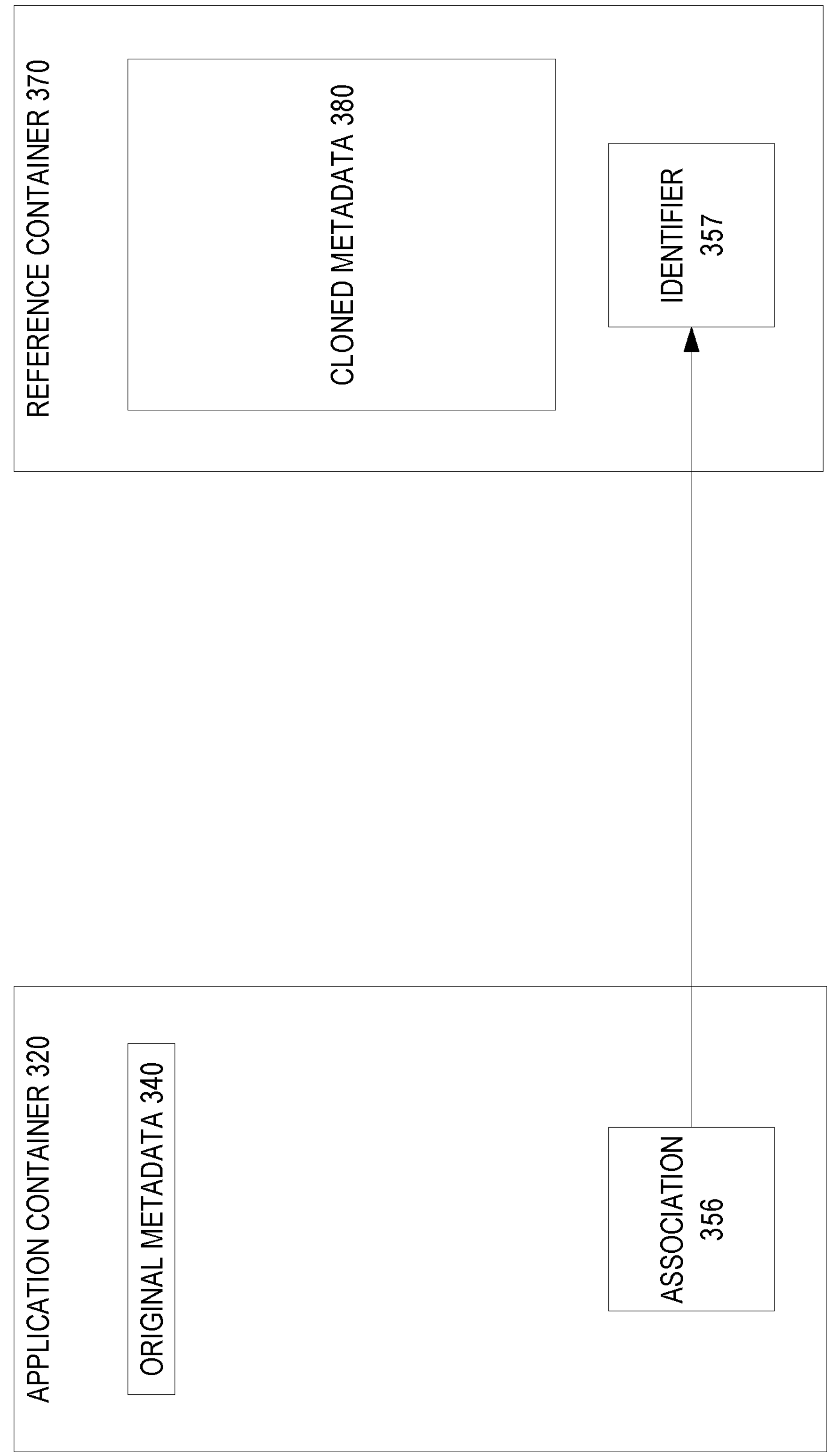
FIG. 3 is a block diagram that depicts an example container database that maintains an association between an application container and a reference container to achieve diversion of metadata retrieval, in an embodiment.

FIG. 3 is a block diagram that depicts an example container database 300 that maintains an association between an application container and a reference container to achieve diversion of metadata retrieval, in an embodiment. Container database 300 may be hosted by an implementation of database server 100.

Container database 300 may be a multitenant container database that may contain at least one application container, such as 320, for at least one application. Application container 320 contains original metadata 340.

At the beginning of a software upgrade of application container 320, the database server creates reference container 370, which includes copying cloned metadata 380 from original metadata 340. During the upgrade, pluggable databases contained within application container 320 may read cloned metadata 380, instead of original metadata 340, to retrieve metadata for ordinary purposes.

However, retrieval of metadata from one application container, 370, for use by a pluggable database of another application container, 320, may need a cross-reference from application container 320 to reference container 370.

To facilitate cross referencing, each application container may have its own unique identifier. For example, reference container 370 is identified by identifier 357. Whereas application container 320 may be identified by a different identifier.

For example, an identifier may be a more or less globally unique identifier. In an embodiment, a database identifier is guaranteed to be unique only within container database 300.

The identifier of one application container, such as identifier 357, may be specified within an association that logically binds one application container to another for the purpose of metadata retrieval. For example, application container 320 contains association 356 as a reference or pointer that identifies reference container 370 as the source for metadata of a pluggable database or its application container.

In an embodiment, association 356 may be used to divert metadata access for all pluggable databases within application container 320. In an embodiment, each pluggable database of application container 320 has its own association 356.

As such, a subset of pluggable databases of application container 320 may be diverted to cloned metadata 380. Furthermore, each pluggable database may have its metadata retrieval diverted to its own reference container. Furthermore, a pluggable database may have its metadata retrieval diverted to another application container that is not a reference clone.

During metadata retrieval for a pluggable database of application container 320, the database server may examine association 356 to detect from which application container the metadata should be retrieved. The database server may then read the metadata from whichever application container is specified by association 356. Upon completion of the upgrade, the database server may reset association 356 to refer to application container 320.

5.0 Clone Consistency

Figure 4:
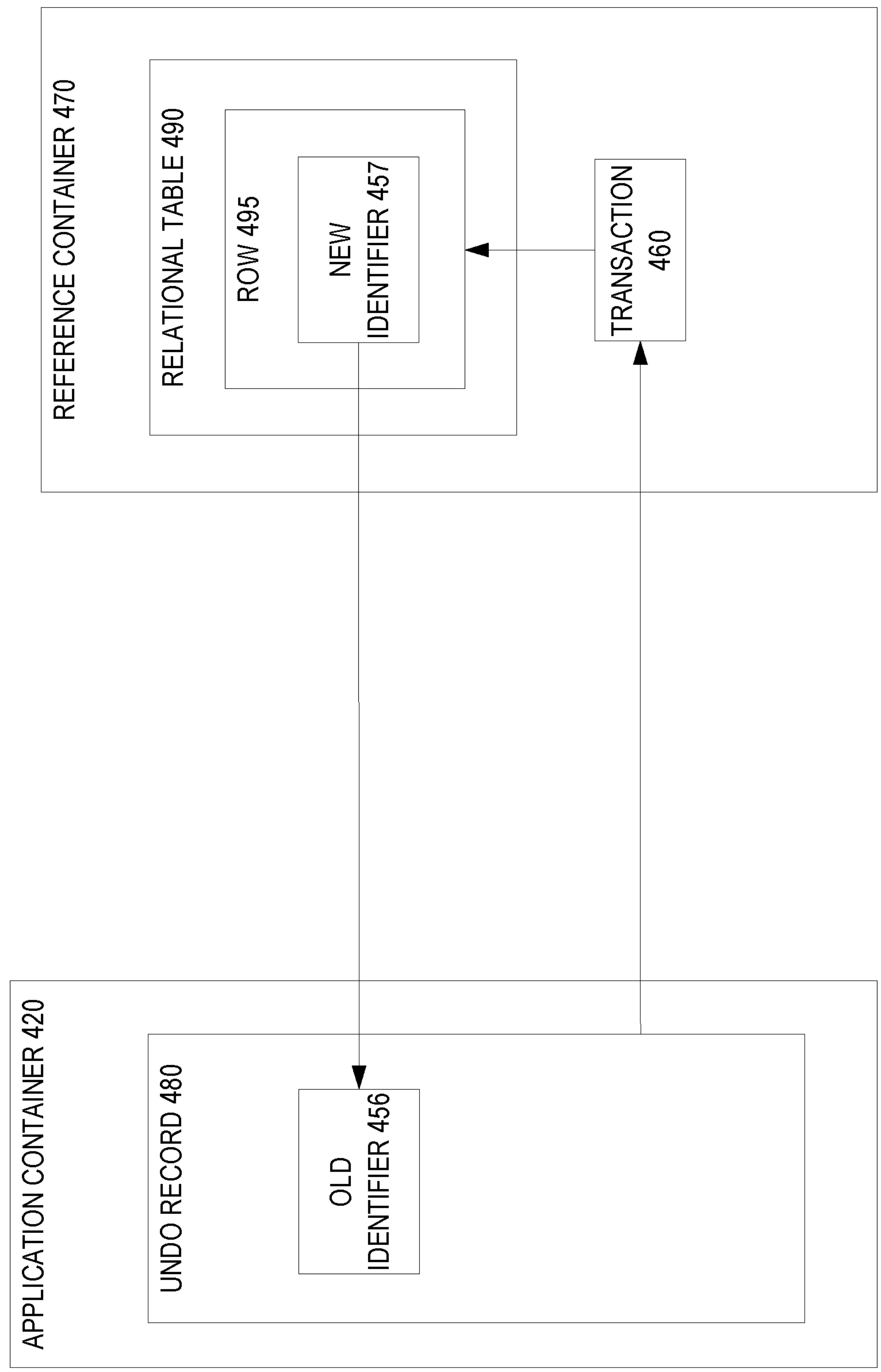
FIG. 4 is a block diagram that depicts an example container database that processes undo records to make consistent a reference container, in an embodiment.

FIG. 4 is a block diagram that depicts an example container database 400 that processes undo records to make consistent a reference container, in an embodiment. Container database 400 may be hosted by an implementation of database server 100.

Container database 400 contains application container 420. During a software upgrade of application container 420, the database server may copy reference container 470 from application container 420, such as by copying data files.

However, copying may occur while application 420 sustains a transactional load. For example, transactions may remain ongoing until after creation of reference container 470.

Furthermore, intermediate data written by an ongoing transaction may be included when copying application container 420 to reference container 470. For example a copied transaction, such as 460, may have altered row 495 of relational table 490 in a way that would only be consistent if transaction 460 finishes.

As such, row 495 may be in an inconsistent state. Furthermore, transaction 460 will not finish within reference container 470, although the transaction may eventually finish within application container 420.

As such, reference container 470 may be inconsistent. Because reference container 470 is used solely for metadata access, inconsistent ordinary (not metadata) data may be tolerated (ignored).

However, inconsistent cloned metadata should be remedied. For example, relational table 490 may be part of cloned metadata instead of ordinary data. For example, relational table 490 may contain predefined specification data, such as zip codes.

5.1 Undo Record and Transaction Rollback

Achieving consistency within reference container 470 may involve undoing (rolling back) transaction 460. The database server typically processes undo records, such as 480, to roll back a transaction.

Each undo record 480 may contain content of a data block as it existed immediately before being modified by a transaction. For example, undo record 480 may hold the prior content of row 495 as it was before transaction 460.

The database server may apply undo record 480 to reference container 470 to roll back transaction 460. To accomplish the roll back in an embodiment, the database server reads undo record 480 from within application container 480.

Undo record 480 may be copied into reference container 470 during 470's creation (by cloning). In a preferred embodiment, the database server accomplishes the roll back by reading the copy of undo record 480 that occupies reference container 470.

Regardless from which application container does the database server retrieve the undo record, the undo record may contain object identifiers that are valid only within application container 420 and not within reference container 470. For example, the undo record may be applied as-is to application container 420. However, the undo record cannot be applied as-is to reference container 470 because identifiers might not be portable between application containers.

As such the database server may, for example with the help of a lookup table, translate any identifier that is specified by undo record 480 and that is valid within application container 420 to a different identifier that is valid within reference container 470.

For example, the database server may populate the lookup table as part of the container cloning process that creates reference container 470. For example, when the database server assigns a new identifier, such as 457, to a clone of a metadata object, the database server may add to the lookup table an entry that maps old identifier 456 to new identifier 457.

During processing of undo record 480, the database server may use old identifier 456, as specified in undo record 480, as a lookup key into the lookup table to translate old identifier 456 into new identifier 457. In this way, the database server may apply undo records to reference container 470, even though the undo records specify identifiers that are invalid within reference container 470.

5.2 Rollback Mechanics

Reference container 470, as a copy of application container 420, may contain some written data that was committed by a completed transaction and some written data that is uncommitted (not yet committed) by an ongoing transaction. As such, the database server may need a mechanism to distinguish uncommitted writes that should be undone within reference container 470 and committed writes that should not be disturbed.

In an embodiment, application container 420 (and its clone, reference container 470) may maintain a listing of pending (ongoing) transactions and there corresponding undo records. In an embodiment, undo record 480 may specify which transaction created it.

In an embodiment, each transaction is assigned a unique serial number or timestamp when committed, and this serial number may be associated with or recorded within each undo record for the transaction. In an embodiment, the database server detects which undo records correspond to uncommitted transactions by detecting which undo records have no associated transaction serial number. The database server may be configured to apply to reference container 470 those undo records that do not have an associated transaction serial number.

6.0 Independent Synchronization

Figure 5:
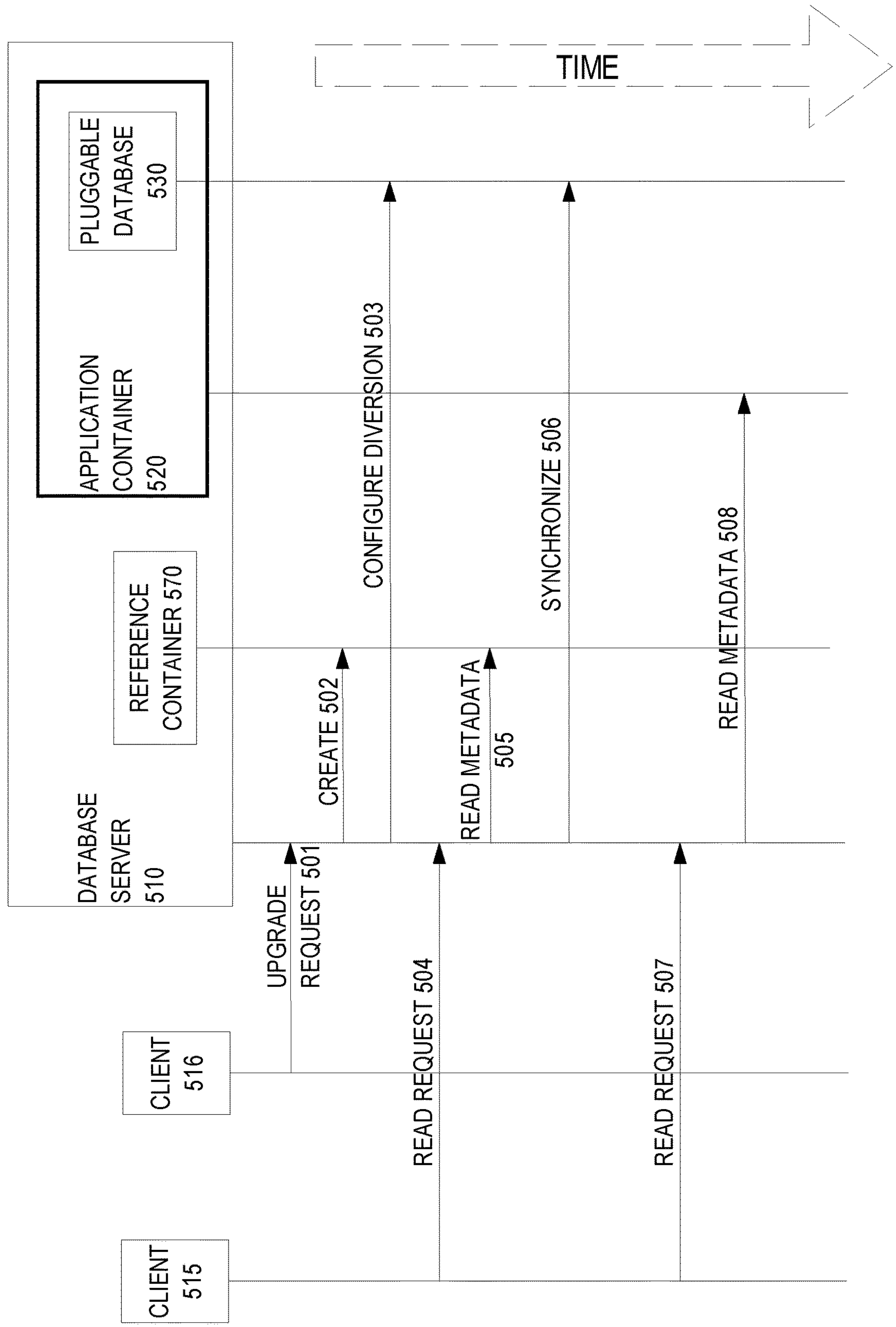
FIG. 5 is a scenario diagram that depicts an example system of computers that selectively upgrades a subset of pluggable databases of an application container, in an embodiment.

FIG. 5 is a scenario diagram that depicts an example system of computers 500 that selectively upgrades a subset of pluggable databases of an application container, in an embodiment. System 500 may be composed of at least one computer.

System 500 includes clients 515-516 and database server 510. Clients 515-516 may be external clients of database server 510.

For example, client 516 may occupy a different computer than database server 510. Likewise, client 516 may occupy a same computer as database server 510, but occupy a different operating system process.

In some cases, client 516 may be embedded within database server 510. For example, client 516 may implement a maintenance chore that database server 510 performs upon itself.

An implementation of client 516 may include a codebase that contains a database connector, such as an open database connectivity (ODBC) driver. Communication between client 516 and database server 510 may occur through transport control protocol (TCP) sockets, through shared memory, or other inter-process channel.

For example, client 516 may send upgrade request 501 to database server 510 to upgrade the software of application container 520 that is contained within database server 510. Although not shown, application container 520 may reside in a container database that resides in database server 510. Database server 510 may be an implementation of database server 100.

Database server 510 may react to upgrade request 501 by cloning application container 520 to create reference container 570, shown as create 502. In a preferred embodiment, application containers 520 and 570 occupy a same container database. In an embodiment, database server 510 has a plurality of container databases, and application containers 520 and 570 occupy separate container databases.

6.1 SQL Recording

However, creation of reference container 570 is not the only work that database server 510 must perform to fulfill upgrade request 501. Typically a software upgrade of application container 520 involves altering the metadata of application container 520.

In an embodiment, upgrading the metadata of application container 520 involves the execution of data manipulation language (DML) and/or data definition language (DDL) statements, which may be scripted or dynamically generated. In an embodiment, all or some of these statements may be recorded, along with their actual parameters.

In an embodiment, upgrading the metadata of application container 520 involves creating or modifying a database view. For example, application 520 may restrict some of its pluggable databases to using a limited view that exposes less metadata.

6.2 Limited Asynchrony

Application container 520 contains pluggable databases such as 530. Also in response to upgrade request 501, database server 510 adjusts a metadata pointer for each pluggable database or for application container 520 as a whole.

This is shown as configure diversion 503. After adjustment, the metadata pointer(s) refer to reference container 570 instead of application container 520.

As such, client 515 may send read request 504 to database server 510 to read metadata for pluggable database 530. However because metadata retrieval is diverted while upgrade request 501 is executing, read request 504 is fulfilled by read metadata 505 that reads reference container 570 instead of application container 520.

As depicted by the dashed arrow on the right edge of FIG. 5, time flows downward. As such, read request 504 occurs after the creation (create 502) of reference container 570.

The shown embodiment achieves limited asynchrony by enabling read request 504 to access cloned metadata while upgrade request 501 is being simultaneously executed, so long as interactions 502-503 have finished. In an embodiment not shown, database server 510 receives read request 504 during the creation of reference container 570 and buffers the request without processing it until interactions 502-503 have finished.

Whether requests are buffered or not, database server 510 detects that metadata retrieval for application container 520 is diverted to reference container 570. For example, database server 510 may still be upgrading application container 520 for upgrade request 501. As such, database server 510 sends (diverts) read metadata 505 to read the metadata of reference container 570 to fulfill read request 504.

6.3 SQL Replay

Eventually, fulfilment of upgrade request 501 finishes, such as after read metadata 505. At this time, continued diversion may or may not be necessary.

For example after the upgrade and although not shown, application container 520 may have a legacy pluggable database that cannot be upgraded because development of the legacy pluggable database as ceased. As such, the legacy pluggable database may have a continued need for the backwards-compatible metadata of reference container 570.

Whereas, pluggable database 530 is upgradable. To accommodate this, database server 510 may be directed by itself or by another agent to upgrade a subset of pluggable databases.

For example and although not shown, database server 510 may receive a command, such as a scripted or interactive command, to upgrade specified pluggable databases, such as 530. Database server 510 may react by invoking synchronize 506 upon pluggable database 530.

Synchronize 506 cancels configured diversion 503 for specified pluggable databases. However before, during, or after cancellation and depending on the implementation, synchronize 506 may also cause the specified pluggable databases to be individually upgraded.

In a preferred embodiment, application container 520 and pluggable database 530 may have metadata that contains a respective data dictionary. During synchronization, the data dictionary of pluggable database 530 may be updated to reflect new data objects that are added to application container 520. This updating may involve recording, refreshing, or updating a link or pointer between application container 520 and pluggable database 530, or between objects within application container 520 and pluggable database 530.

Upgrading pluggable database 530 may entail executing logic of components 510, 520, and/or 530. It may also entail replaying (repeating), into pluggable database 530, database statements that were recorded while upgrading the metadata of application container 520 during execution of upgrade request 501, as explained above.

In a preferred embodiment, the database statements are recorded as a re-playable script. Either creating or replaying the script may involve filtering out (skipping) statements that are only operable or useful at application container 520.

For example, metadata objects may be replicated into both of application container 520 and pluggable database 530. However, application container 520 may have objects that pluggable database 530 lacks.

After fulfilment of synchronize 506, diversion ceases for pluggable database 530, which is re-associated with the metadata of application container 520. As such, read request 507 is satisfied by read metadata 508 using metadata from application container 520 instead of from reference container 570. However, pluggable databases of application container 520 that have not been upgraded, such as by synchronize 506, continue to have metadata retrieval diverted to reference container 570.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
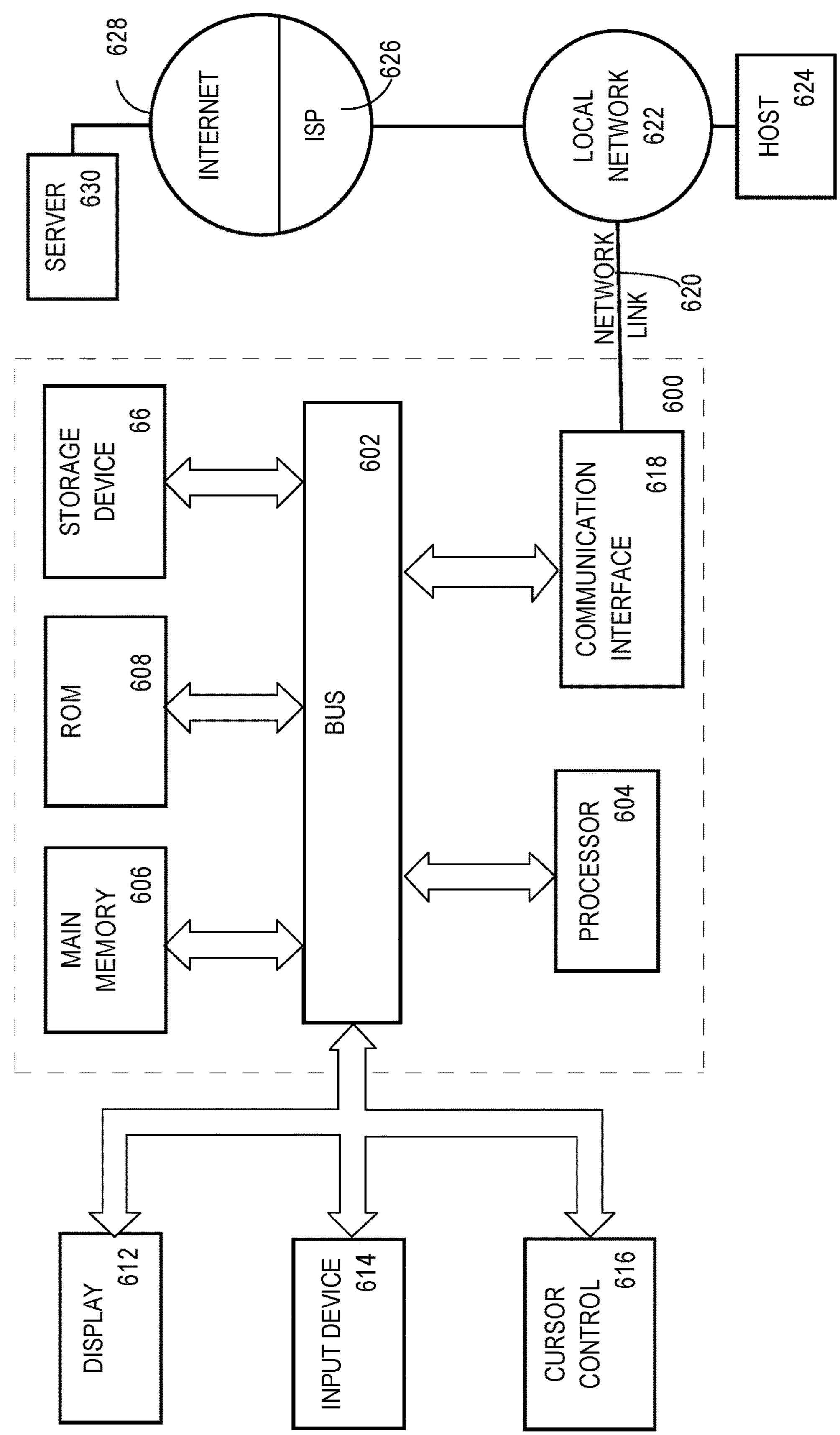
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 66, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 66. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 66. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 66 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 66, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

storing, within an original application container database of a database application, original metadata that defines one or more objects for use by a plurality of pluggable databases of the database application that reside in the original application container database;

receiving a maintenance request to adjust the original metadata;

creating, in response to receiving the maintenance request to adjust the original metadata, a reference application container database that contains cloned metadata that is a copy of the original metadata, wherein a container database contains a plurality of application container databases that includes the original application container database and the reference application container database;

receiving, during or after creating the reference application container database, a read request to read an object of the one or more objects;

concurrently performing both of:

adjusting the original metadata in the original application container database by executing the maintenance request, and executing the read request upon the cloned metadata of the reference application container database;

updating, based on said adjusting the original metadata, a database dictionary of at least one pluggable database of the plurality of pluggable databases.

2. The method of claim 1 wherein creating the reference application container database comprises associating the original application container database or the original metadata to an identifier of the reference application container database or an identifier of the cloned metadata.

3. The method of claim 1 wherein executing the maintenance request comprises:

issuing one or more database statements to the original application container database, and creating a recording of the one or more database statements;

issuing the one or more database statements to at least one pluggable database of said plurality of pluggable databases by replaying the recording.

4. The method of claim 1 wherein creating the reference application container database comprises making the reference application container database consistent by applying an undo record to roll back a transaction.

5. The method of claim 4 wherein:

creating the reference application container database comprises assigning a new identifier to an object within the reference application container database;

the undo record contains an old identifier of the object;

applying the undo record comprises translating the old identifier into the new identifier.

6. The method of claim 1 further comprising:

receiving, after executing the maintenance request, an additional request to read the original metadata;

executing the additional request upon the original metadata of the original application container database.

7. The method of claim 6 wherein after executing the maintenance request comprises after receiving a command to cease using the reference application container database.

8. The method of claim 1 wherein the reference application container database is read only or does not accept client connections.

9. The method of claim 1 wherein executing the maintenance request comprises creating or modifying a database view that hides a subset of the original metadata.

10. The method of claim 1 wherein the cloned metadata comprises one or more metadata rows contained in one or more relational tables.

11. A system comprising:

database storage configured to store and retrieve, within an original application container database of a database application, original metadata that defines one or more objects for use by a plurality of pluggable databases of the database application that reside in the original application container database;

a processor connected to the database storage and configured to:

receive a maintenance request to adjust the original metadata;

create, in response to receiving the maintenance request to adjust the original metadata and within the database storage, a reference application container database that contains cloned metadata that is a copy of the original metadata, wherein a container database contains a plurality of application container databases that includes the original application container database and the reference application container database;

receive, during or after creating the reference application container database, a read request to read an object of the one or more objects;

concurrently perform both of:

adjusting the original metadata in the original application container database by executing the maintenance request upon the original metadata, and executing the read request upon the cloned metadata of the reference application container database;

updating, based on said adjusting the original metadata, a database dictionary of at least one pluggable database of the plurality of pluggable databases.

12. One or more non-transitory computer-readable media storing instructions that, when executed by one or more processors, cause:

storing, within an original application container database of a database application, original metadata that defines one or more objects for use by a plurality of pluggable databases of the database application that reside in the original application container database;

receiving a maintenance request to adjust the original metadata;

creating, in response to receiving the maintenance request to adjust the original metadata, a reference application container database that contains cloned metadata that is a copy of the original metadata, wherein a container database contains a plurality of application container databases that includes the original application container database and the reference application container database;

receiving, during or after creating the reference application container database, a read request to read an object of the one or more objects;

concurrently performing both of:

adjusting the original metadata in the original application container database by executing the maintenance request upon the original metadata, and executing the read request upon the cloned metadata of the reference application container database;

updating, based on said adjusting the original metadata, a database dictionary of at least one pluggable database of the plurality of pluggable databases.

13. The one or more non-transitory computer-readable media of claim 12 wherein creating the reference application container database comprises associating the original application container database or the original metadata to an identifier of the reference application container database or an identifier of the cloned metadata.

14. The one or more non-transitory computer-readable media of claim 12 wherein creating the reference application container database comprises making the reference application container database consistent by applying an undo record to roll back a transaction.

15. The one or more non-transitory computer-readable media of claim 14 wherein:

creating the reference application container database comprises assigning a new identifier to an object within the reference application container database;

the undo record contains an old identifier of the object;

applying the undo record comprises translating the old identifier into the new identifier.

16. The one or more non-transitory computer-readable media of claim 12 wherein the instructions further cause:

receiving, after executing the maintenance request, an additional request to read the original metadata;

executing the additional request upon the original metadata of the original application container database.

17. The one or more non-transitory computer-readable media of claim 16 wherein after executing the maintenance request comprises after receiving a command to cease using the reference application container database.

18. The one or more non-transitory computer-readable media of claim 12 wherein executing the maintenance request comprises creating or modifying a database view that hides a subset of the original metadata.

19. The one or more non-transitory computer-readable media of claim 12 wherein executing the maintenance request comprises:

issuing one or more database statements to the original application container database, and creating a recording of the one or more database statements;

issuing the one or more database statements to at least one pluggable database of said plurality of pluggable databases by replaying the recording.

* * * * *

UNITED STATES PATENT AND TRADEMARK OFFICE

CERTIFICATE OF CORRECTION

PATENT NO. : 10,635,658 B2
APPLICATION NO. : 15/266917
DATED : April 28, 2020
INVENTOR(S) : Yam et al.

It is certified that error appears in the above-identified patent and that said Letters Patent is hereby corrected as shown below:

On the Title Page

On page 2, Column 2, under Other Publications, Line 50, delete “Restrcition” and insert -- Restriction --, therefor.

In the Specification

In Column 1, Line 7, before “This” insert -- This application claims the benefit of Provisional Application. 62/245,937, filed October 23, 2015, the entire contents of which is hereby incorporated by reference for all purposes as if fully set forth herein. --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*